(12) United States Patent
Yan

(10) Patent No.: US 10,543,864 B2
(45) Date of Patent: Jan. 28, 2020

(54) WHEEL REVERSING MECHANISM AND CART FRAME

(71) Applicants: SHANGHAI BAOTUNG TECH. CO., LTD., Shanghai (CN); BEIJING XIAOMI MOBILE SOFTWARE CO., LTD., Beijing (CN)

(72) Inventor: Shuming Yan, Beijing (CN)

(73) Assignees: Shanghai Baotung Tech. Co., Ltd., Shanghai (CN); Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/042,801

(22) Filed: Jul. 23, 2018

(65) Prior Publication Data
US 2019/0023301 A1  Jan. 24, 2019

(30) Foreign Application Priority Data

Jul. 24, 2017  (CN) .......................... 2017 1 0607700
Jul. 24, 2017  (CN) .................... 2017 2 0902885 U

(51) Int. Cl.
*B62B 7/08* (2006.01)
*B62B 9/18* (2006.01)
*B62B 7/14* (2006.01)

(52) U.S. Cl.
CPC ............. *B62B 7/08* (2013.01); *B62B 7/142* (2013.01); *B62B 9/185* (2013.01); *B62B 2205/123* (2013.01); *B62B 2205/20* (2013.01)

(58) Field of Classification Search
CPC ......... B62B 7/06; B62B 7/08; B62B 2205/12; B62B 3/02
See application file for complete search history.

(56) References Cited

U.S. PATENT DOCUMENTS 5,803,471 A * 9/1998 DeMars ................. B62B 1/125
                                                          280/40
7,819,409 B2 * 10/2010 Chang ................... B62B 5/0083
                                                          280/47.17
(Continued)

FOREIGN PATENT DOCUMENTS

CN        201082719 Y        7/2008
CN        201183513 Y        1/2009
(Continued)

OTHER PUBLICATIONS

Extended Search Report in European Application No. 18185212.0, dated Dec. 20, 2018, 9 pages.
(Continued)

*Primary Examiner* — Brian L Swenson
(74) *Attorney, Agent, or Firm* — Arch & Lake LLP

(57) ABSTRACT

A wheel reversing mechanism, a cart frame, and an apparatus are provided. The wheel reversing mechanism includes a frame, a wheel assembly and a linkage assembly provided within the frame. The linkage assembly includes a locking mechanism and an actuator cooperated with the wheel assembly. The wheel assembly includes a wheel joint and a wheel connected to the wheel joint. The wheel joint is rotatably connected to a lower end of the frame, the actuator is connected to the wheel joint. The locking mechanism is locked to the wheel joint. The linkage assembly is acted by an external force, such that the locking mechanism is unlocked from the wheel joint, and further, the actuator controls the wheel joint to rotate relative to the frame.

19 Claims, 5 Drawing Sheets

(56) References Cited

U.S. PATENT DOCUMENTS

| | | | |
|---|---|---|---|
| 8,465,029 B2 * | 6/2013 | Yang | B62B 1/12 280/47.27 |
| 8,544,871 B1 * | 10/2013 | Liao | B62B 3/02 280/62 |
| 8,764,030 B1 | 7/2014 | Murphy | |
| 9,199,655 B1 * | 12/2015 | Su | B62B 1/125 |
| 9,327,745 B2 * | 5/2016 | Tsai | B62B 1/042 |
| 9,616,907 B1 * | 4/2017 | Gibson | B62B 1/12 |
| 9,637,149 B1 * | 5/2017 | Wang | B62B 1/002 |
| 10,040,466 B1 * | 8/2018 | Su | B62B 1/12 |
| 2006/0061053 A1 | 3/2006 | Cortese | |
| 2011/0221146 A1 | 9/2011 | Leung | |
| 2014/0183832 A1 | 7/2014 | Wang et al. | |
| 2016/0185372 A1 | 6/2016 | Zhang | |
| 2016/0185374 A1 * | 6/2016 | Zhang | B62B 3/02 280/651 |

FOREIGN PATENT DOCUMENTS

| | | |
|---|---|---|
| CN | 201329886 Y | 10/2009 |
| CN | 203946142 U | 11/2014 |
| CN | 204341142 U | 5/2015 |
| CN | 105151105 A | 12/2015 |
| CN | 205010295 U | 2/2016 |
| CN | 106627721 A | 5/2017 |
| DE | 202012102658 U1 | 8/2012 |
| EP | 1647463 A2 | 4/2006 |
| EP | 3190026 A1 | 7/2017 |
| JP | 2008049945 A | 3/2008 |
| KR | 201985-0009544 A | 12/1985 |
| WO | 2011017818 A1 | 2/2011 |

OTHER PUBLICATIONS

International Search Report (including English translation) and Written Opinion dated Jun. 4, 2018 for corresponding PCT/CN2018/078890, 9 pages.
Australian Office Action issued in corresponding AU Patent Application No. 2018206778, dated Feb. 25, 2019, 6 pages.
Notice of Preliminary Rejection corresponding Korean Application No. 10-2018-7014825, dated Aug. 20, 2019, (6p).
English translation of Notice of Preliminary Rejection to Korean Application No. 10-2018-7014825 dated Aug. 20, 2019, (5p).
International Search Report dated Jun. 4, 2018 for corresponding PCT/CN2018/078899, 5 pages.
First Office Action to Japanese Patent Application No. 2018-526743 dated Sep. 18, 2019, (4p).

* cited by examiner

WHEEL REVERSING MECHANISM AND CART FRAME

CROSS REFERENCE TO RELATED APPLICATION

This application claims benefits of Chinese Patent Applications No. 201710607700.0 and 201720902885.3, filed on Jul. 24, 2017 in the State Intellectual Property Office of China, the disclosure of which is incorporated herein by reference in its entirety.

TECHNICAL FIELD

The present disclosure relates to a cart technical field, particularly to a wheel reversing mechanism and a cart frame, which are conveniently folded.

BACKGROUND ART

Carts are widely used in people's lives to bring great convenience for transportation and traveling. In the prior art, wheel(s) of a majority of carts cannot be folded, and thereby occupies a large space. A minority of carts has a function of the wheel(s) that can be folded but usually manually folded. This folding method is more complicated, and thereby leading to the user's operation more difficult.

SUMMARY

Therefore, the present disclosure provides a wheel reversing mechanism and a cart frame, which can be conveniently folded.

To solve the above object, following technical solutions are employed in the present disclosure.

According to one aspect of the present disclosure, there is provided a wheel reversing mechanism, including a frame, a wheel assembly and a linkage assembly provided within the frame. The linkage assembly includes a locking mechanism and an actuator cooperated with the wheel assembly. The wheel assembly includes a wheel joint and a wheel connected to the wheel joint. The wheel joint is rotatably connected to a lower end of the frame, the actuator is connected to the wheel joint, and the locking mechanism is locked to the wheel joint. The linkage assembly is acted by an external force, such that the locking mechanism is unlocked from the wheel joint, and further, the actuator controls the wheel joint to rotate relative to the frame.

According to a second aspect of the present disclosure, there is provided a cart frame, comprising a main body and the wheel reversing mechanism according to any one of the preceding claims, the wheel reversing mechanism being provided on the main body. The wheel assembly of the wheel reversing mechanism is rotatable relative to the main body upon the action of the linkage assembly.

According to a third aspect, an apparatus includes a main body and a wheel reversing mechanism on the main body. The wheel reversing mechanism comprises: a frame, a wheel assembly, and a linkage assembly disposed at least partially within the frame. The linkage assembly comprises a locking mechanism and an actuator cooperated with the wheel assembly, and the wheel assembly comprises a wheel joint and a wheel connected to the wheel joint. The wheel joint is rotatably connected to a lower end of the frame, the actuator is connected to the wheel joint, and the locking mechanism is locked to the wheel joint. The locking mechanism is configured to be unlocked from the wheel joint so that the wheel joint is rotatable relative to the frame.

It is to be understood that both the foregoing general description and the following detailed description are exemplary and explanatory only and are not restrictive of the invention, as claimed.

DETAILED DESCRIPTION

Hereinafter, aspects of the present disclosure will be described in conjunction with the accompanying drawings, rather than to limit the present disclosure. Variations of structure, method, or functional made by the ordinary skilled in the art based on these examples are all contained in the scope of the present disclosure.

The terms used in present disclosure are merely directed to illustrate the particular examples, rather than limit to the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combination of one or more associated listed items.

The technical solutions as provided in the present disclosure may include the following advantages: the wheel reversing mechanism of the present disclosure can be unlocked by the locking mechanism, and then the wheel assembly can be reversed by the actuator through the linkage assembly while the cart frame is folded, such that the wheel assembly is folded conveniently, and thus occupies smaller space after being folded.

Some embodiments of the present disclosure will be described in detail with reference to the accompanying drawings. In the case of no conflict, the following embodiments and the features in the embodiments may be combined with each other.

Figure 1:
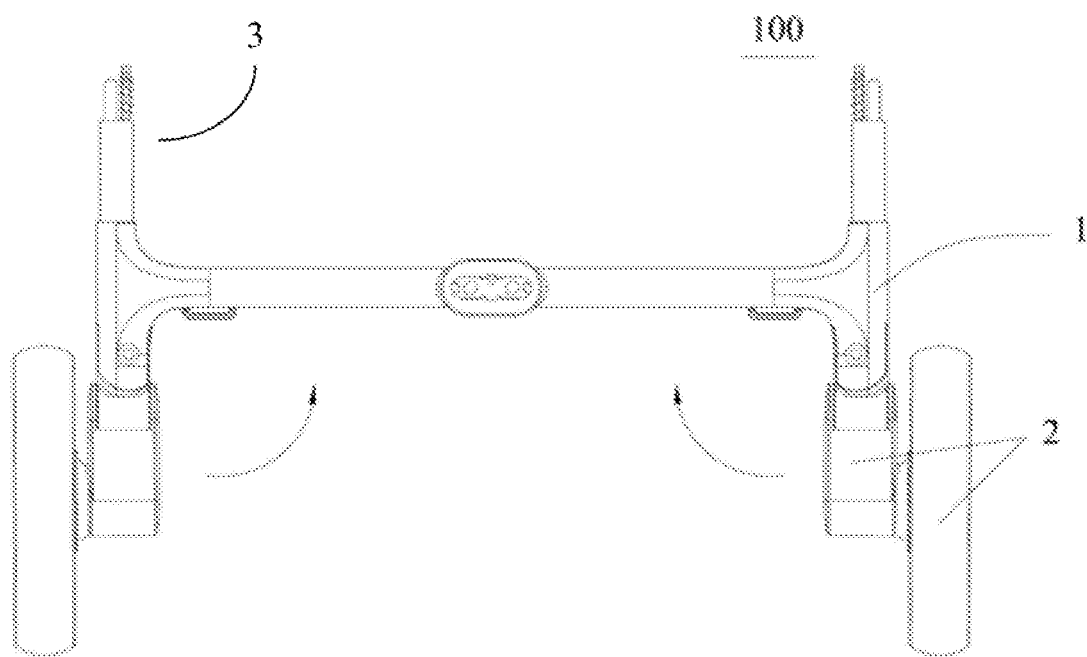
FIG. 1 is a schematic structural diagram of a wheel reversing mechanism in a working state according to an aspect of the present disclosure.
Figure 2:
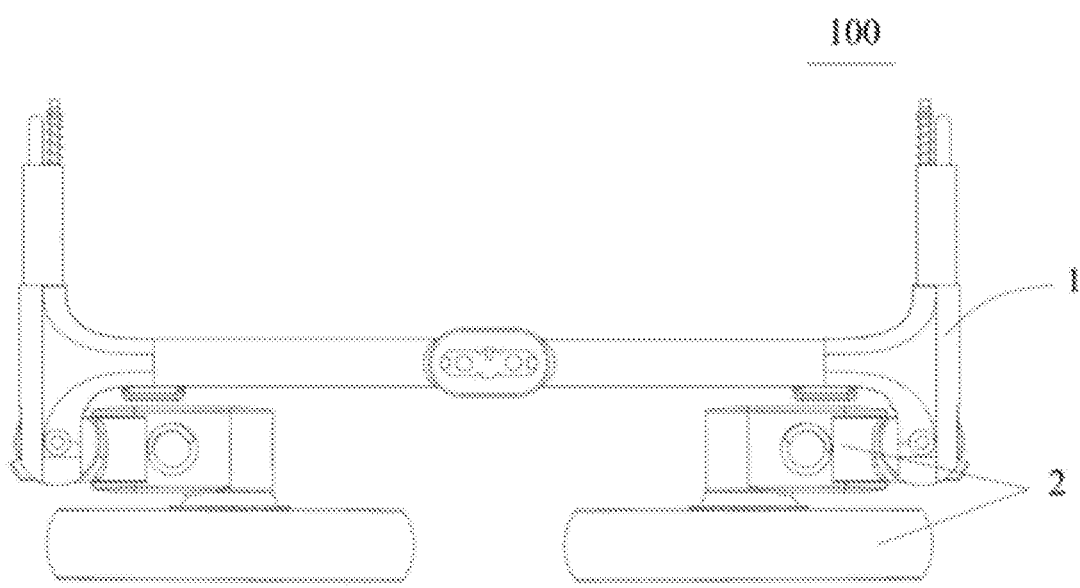
FIG. 2 is a schematic structural diagram of a wheel reversing mechanism in a folded state according to an aspect of present disclosure.
Figure 3:
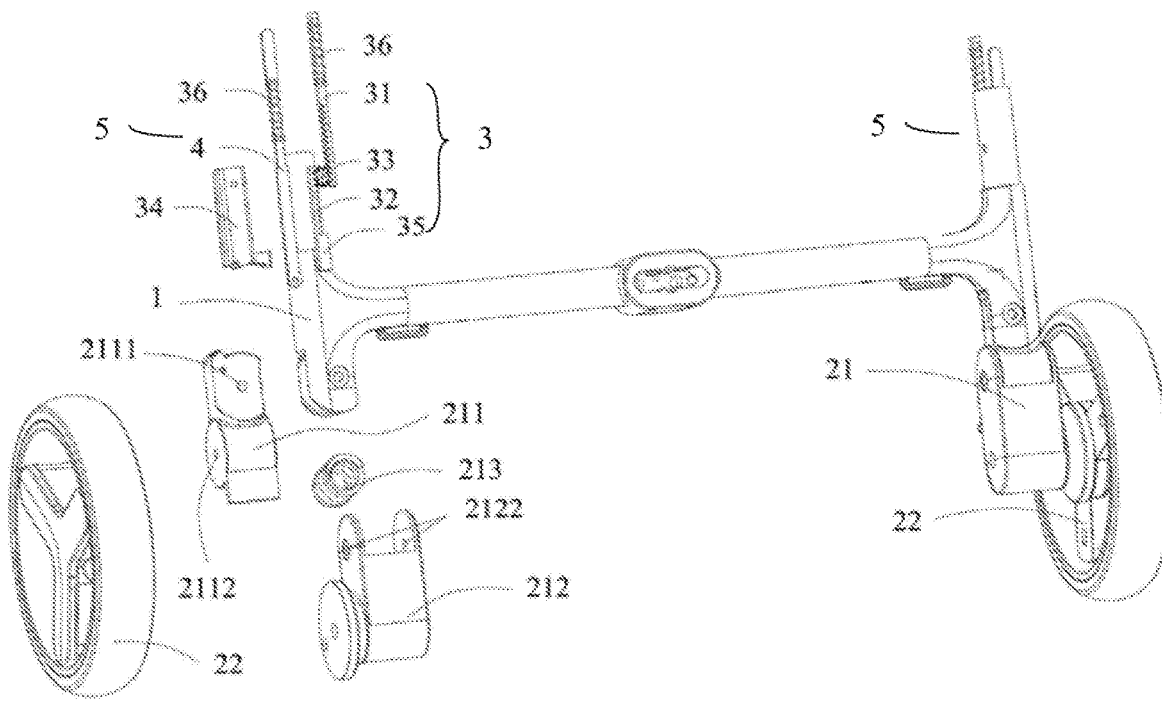
FIG. 3 is a partially exploded schematic view of the wheel reversing mechanism according to an aspect of present disclosure.

As shown in FIG. 1 to FIG. 3, the wheel reversing mechanism 100 in an aspect of the present disclosure may be applied to any cart frame, so that the cart frame can be conveniently folded. The wheel reversing mechanism 100 may be a structure that includes a frame 1, a wheel assembly 2, and a linkage assembly 5 disposed at least partially in the frame 1. The frame 1 is provided with a receiving channel for receiving the linkage assembly, so that the linkage assembly 5 may be acted upon by external force to be folded together with the wheel assembly 2. This folding method is convenient and simplifies the operation. In the present disclosure, the frame 1 may be a front frame 1 or a rear frame 1 of the cart frame, correspondingly, the wheel assembly 2 also may be a front wheel assembly or a rear wheel assembly.

The linkage assembly 5 includes a locking mechanism 3 and an actuator 4 which are cooperated with the wheel assembly 2. The locking mechanism 3 upon action of the external force may be locked to the wheel assembly 2 and unlocked from the wheel assembly 2, such that the wheel assembly 2 can be unlocked and then reversed into a folded state or locked into a working state. In other words, when external force is applied in a first manner, the wheel assembly 2 may be unlocked by the locking mechanism 3, so as to be reversed into the folded state. When external force is applied in a second manner, the wheel assembly 2 may be reversed from the folded state to be unfolded and then be locked by the locking mechanism 3 into the working state. The wheel assembly 2 includes a wheel joint 21 and a wheel 22 connected to the wheel joint 21. The wheel joint 21 is rotatably connected to a lower end of the frame 1, and the actuator 4 is connected to the wheel joint 21. The actuator 4 may apply a force to the wheel joint 21 upon the action of the external force to control rotation of the wheel joint 21 relative to the frame 1, such that the wheel assembly 2 can be folded. The locking mechanism of the present disclosure is used to lock the wheel joint 21, during the wheel assembly 2 is reversed and folded, the linkage assembly 5 is acted upon by the external force, such that the locking mechanism is unlocked from the wheel joint 21, and furthermore, the actuator 4 controls rotation of the wheel joint 21 relative to the frame 1. In other words, the locking mechanism 3 is configured to be unlocked from the wheel joint 21 so that the wheel joint 21 is rotatable relative to the frame 1.

Here, the wheel 22 may be rotatable relative to the frame 1 within a range of −180°~180°. The wheel 22, in the practical use, may be reversed towards an inner side or an outer side of the cart frame, of course, the wheel 22 may also be reversed in an opposite direction of the front wheel or the rear wheel of the cart frame, which particularly can be determined according to an eccentric position where the actuator 4 is connected to the wheel joint 21.

Furthermore, the wheel joint 21 includes an adaptor 211, a wheel seat 212 and a damper spring 213 provided between the adaptor 211 and the wheel seat 212. Such arrangement of the damper spring 213 may facilitate for relieving vibration within the cart during walking. Optionally, a limiting boss (not shown) may be provided on the adaptor 211 or the wheel seat 212, and the damper spring 213 is sleeved on the limiting boss, such that the damper spring 213 can connect the adaptor 211 with the wheel seat 212. In addition, the limiting boss may also control compression distance of the damper spring 213, so as to improve utilization of the damper spring 213.

The adaptor 211 includes a first axial bore 2111 connected to the frame 1 and a second axial bore 2112 connected to the wheel seat 212. The wheel seat 212 includes an axial connection part 2121 matched with the second axial bore 2112 and a third axial bore 2122 connected with the wheel 22. Wherein, an axial direction of the second axial bore 2112 is identical to an axial direction of the third axial bore 2122, and an axial direction of the first axial bore 2111 is perpendicular to the axial direction of the second axial bore 2112, with such arrangement, the wheel 22 has different adjusting directions.

In the present disclosure, the actuator 4 can control the wheel 22 to rotate towards different directions due to different position where the actuator is connected to the adaptor 211. In particular, when the actuator 4 is connected to the outer side corresponding to the first axial bore 2111, the actuator 4 may rotate the wheel joint 21 towards the inner side of the cart frame by means of thrust force acted on the wheel joint 21, and also rotate the wheel joint 21 towards the outer side of the cart frame by means of tension force acted on the wheel joint 21; and when the actuator 4 is connected to the inner side corresponding to the first axial bore 2111, the actuator 4 may rotate the wheel joint 21 towards the outer side of the cart frame by means of the thrust force acted on the wheel joint 21, and also rotate the wheel joint 21 towards the inner side of the cart frame by means of the tension force acted on the wheel joint 21.

As shown in FIG. 1 to FIG. 3, in some embodiments, the locking mechanism 3 includes an upper gear rack 31, a lower gear rack 32, a gear 33 respectively engaged with the upper gear rack 31 and the lower gear rack 32, an internal fixing plug 34 provided within the frame 1, and a locking member 35 that is provided at the lower end of the lower gear rack 32 to be compatibly locked to the wheel joint 21. Wherein, the upper gear rack 31, the lower gear rack 32 and the gear 33 are equipped in the internal fixing plug 34; the gear 33 is rotatably connected into the internal fixing plug 34 via a pin; and the upper gear rack 31 and the lower gear rack 32 may be movable within the internal fixing plug 3. Furthermore, a restoring spring 36 is further provided at the upper ends of the upper gear rack 31 and the lower gear rack 32, and is equipped within the internal fixing plug 34, which facilitates for transferring the wheel assembly 2 from a folded state to working state to make the user's operation more convenient.

In one or more embodiments, the actuator 4 is a swing bar that has a lower end connected to the wheel joint 21. In the axial direction of the frame 1, the upper end of the locking mechanism, compared to a free end of the actuator 4, is distanced away from the lower end of the frame 1. With such arrangement, when the cart is folded, an axial force on the frame 1 can be acted on the locking mechanism to make the locking mechanism unlocked, and then acted on the actuator 4 such that the actuator 4 thrusts the wheel assembly 2 to be reversed. Wherein along the length of the actuator 4 the dimension difference between the locking mechanism and the actuator 4 is greater than or equal to the dimension of the locking member 35, which can ensure the actuator 4 is linked to reverse the wheel assembly 2 once again after the locking mechanism is unlocked. Wherein, the locking member may be a locking pin, a locking tongue, a locking block and a locking hook, etc.

Optionally, actuator 4 includes a traction cable and a torsion spring connected between the wheel joint 21 and the frame 1. A lower end of the traction cable is connected to the wheel joint 21. Wherein, the wheel joint 21 is reversed relative to the frame 1 upon the action of the torsion spring, and restores to the working state upon the action of the tension force of the traction cable. In use, the locking mechanism is acted upon by the axial force of the frame 1 in advance, such that the wheel joint 21 is unlocked and then reversed relative to the frame 1 upon the action of the torsion spring. When the wheel assembly 2 is required to be used, the traction cable is drawn by the external force to reverse the wheel assembly 2 to be restored to the working state, and then the wheel joint 21 is locked by the locking mechanism.

In addition, the actuator 4 may also be an actuation gear rack. At the end of the wheel joint 21 is provided with a gear cooperated with the actuation gear rack. Wherein, the actuation gear rack is movable along the axis of the frame 1 upon the action of the external force, and links the gear of the wheel joint 21, such that the wheel joint 21 is rotatable about an axis connecting the frame 1 and the wheel joint 21. In use, the locking mechanism is acted upon by the axial force in advance such that the wheel joint 21 is unlocked, and then the actuation gear rack is acted by the axial force of the frame 1 to reverse the wheel joint 21 with linkage with the actuation gear rack, such that reversion of the wheel assembly 2 can be achieved.

Figure 4:
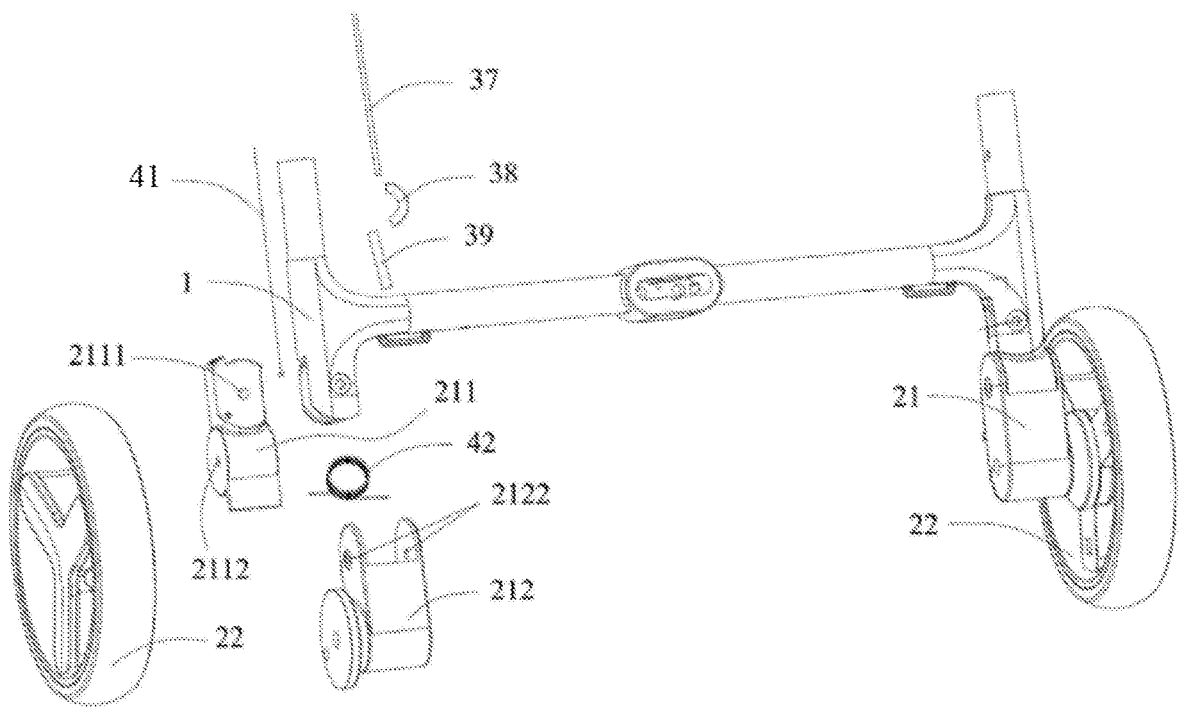
FIG. 4 is a partially exploded schematic view of the wheel reversing mechanism according to a further aspect of the present disclosure.

As shown in FIG. 4, the locking mechanism includes a connecting rod 37, a transmission rod 38 having one end connected to the lower end of the connecting rod 37, and a locking member 39 connected to the other end of the transmission rod 38. Wherein, the locking member 39, under the cooperation of the connecting rod 37 with the transmission rod 38, is movable in an axial direction of the frame 1 opposite to the movement direction of the connecting rod 37 to be locked to the wheel joint 21 or removed from the wheel joint 21 to be unlocked. The actuator 4 includes a traction cable 41 and a torsion spring 42 that is connected between the wheel joint 21 and the frame 1. The lower end of the traction cable 41 is connected to the wheel joint 21. Wherein, the wheel joint 21 is reversed relative to the frame 1 upon the action of the torsion spring 42, and restored to the working state upon the tension force of the traction cable 41. In use, the locking mechanism is acted by the axial force of the frame 1 in advance, such that the wheel joint 21 is unlocked, and then reversed relative to the frame 1 upon the action of the torsion spring 42; when the wheel assembly 2 is required to be used, a user may draw the traction cable 41 to reverse the wheel assembly 2 to be restore to the working state, and then the wheel joint 21 is locked by means of the locking mechanism.

Figure 5:
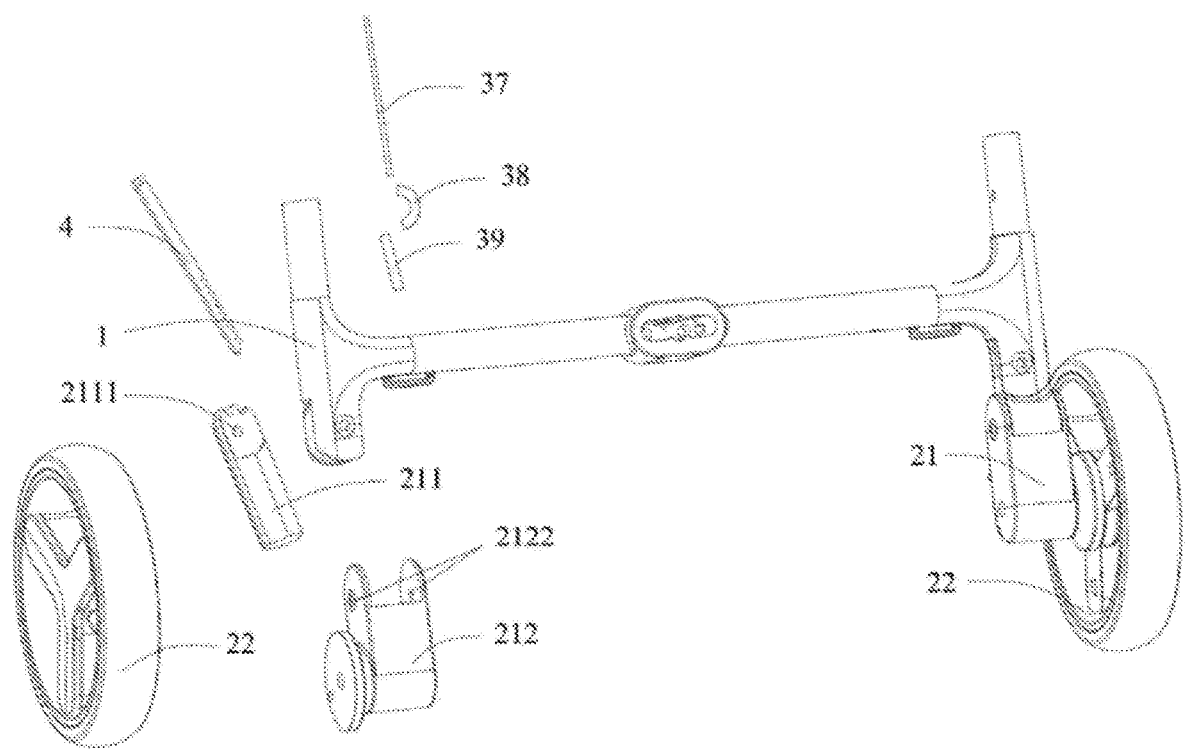
FIG. 5 is a partially exploded schematic view of the wheel reversing mechanism according to a further aspect of the present disclosure.

As shown in FIG. 5, the locking mechanism includes a connecting rod 37, a transmission rod 38 having one end connected to the lower end of the connecting rod 37, and a locking member 39 connected to the other end of the transmission rod 38. Here, the locking member 39, under the cooperation of the connecting rod 37 with the transmission rod 38, is movable in an axial direction of the frame 1 opposite to the movement direction of the connecting rod 37 to be locked to the wheel joint 21 or removed from the wheel joint 21 to be unlocked. The actuator 4 also may be an actuation gear rack. At the end of the wheel joint 21 is provided with a gear cooperated with the actuation gear rack. Wherein, actuation gear rack is movable along the axis of the frame 1 upon the action of the external force, and links the gear of the wheel joint 21, such that the wheel joint 21 is rotatable about an axis connecting the frame 1 and the wheel joint 2. In use, the locking mechanism is acted by the axial force of the frame 1 in advance such that the wheel joint 21 is unlocked, and then the actuation gear rack is acted by the axial force of the frame 1 to reverse the wheel joint 21, such that reversion of the wheel assembly 2 can be achieved.

In one or more examples, the locking mechanism includes a connecting rod, a transmission rode having one end connected to the lower end of the connecting rod, and a locking member connected to the other end of the transmission rod. Wherein, the transmission rod is arc-shaped. The locking member, under the cooperation of the connecting rod with the transmission rod, is movable in an axial direction of the frame 1 opposite to the movement direction of the connecting rod to be locked to the wheel joint 21 or removed from the wheel joint 21 to be unlocked. The actuator 4 is a swing bar with one lower end connected to the wheel joint 21. In the axial direction of the frame 1, the upper end of the locking mechanism, compared to a free end of the actuator 4, is distanced away from the lower end of the frame. With such arrangement, when the cart is folded, an axial force on the frame 1 can be acted on the locking mechanism to make the locking mechanism unlocked, and then acted on the actuator 4 such that the actuator 4 thrusts the wheel assembly 2 to be reversed. Wherein, along the length of the actuator 4 the dimension difference between the locking mechanism and the actuator 4 is greater than or equal to the dimension of the locking member, which can ensure the actuator 4 is linked to reverse the wheel assembly 2 once again after the locking mechanism is unlocked.

Figure 6:
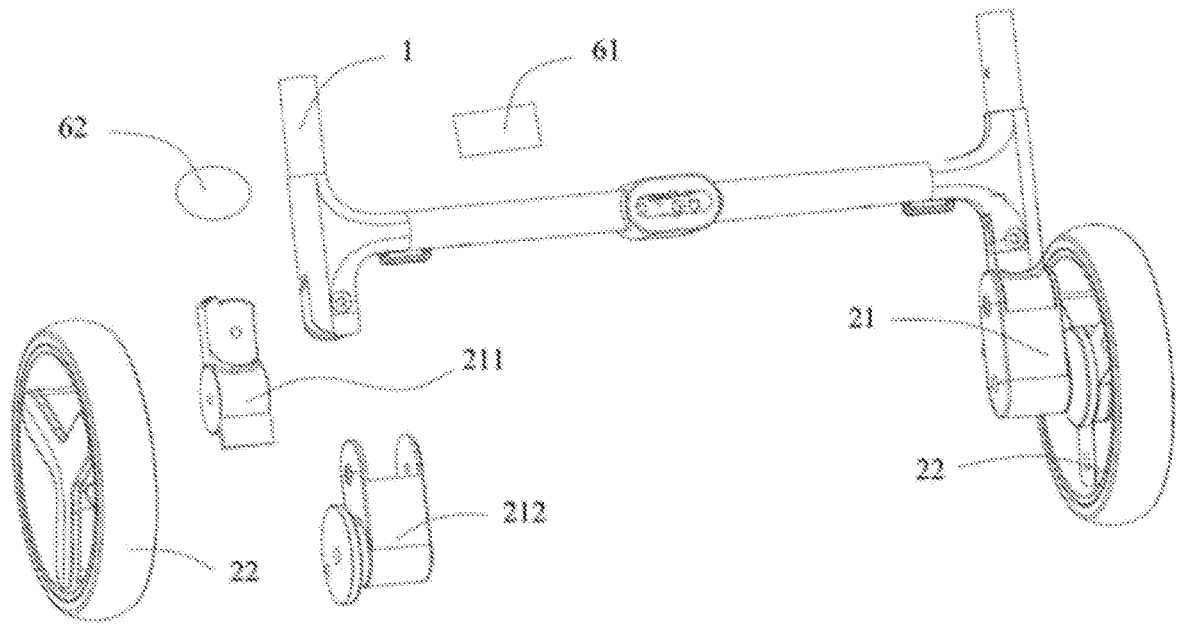
FIG. 6 is a partially exploded schematic view of the wheel reversing mechanism according to a further aspect of the present disclosure.

As shown in FIG. 6, the linkage assembly includes an electric motor 61 provided within the frame, and a turbine 62 connected to the electric motor 61. The turbine 62 is compatibly connected with the wheel joint 21, such that the turbine 62 may be driven by the electric motor 61 to be rotated, so as to rotate the wheel assembly relative to the frame 1. In addition, the turbine 62 is further provided with a function of self-locking structure, in particular, may be coupled with the wheel joint 21 by means of the structure, such as the pin, the locking tongue, the locking block, to restrict the wheel joint 21 from rotating relative to the frame 1. When the cart frame needs to be folded, the electric motor 61 is triggered to rotate the turbine 62, such that the turbine 62 is unlocked from the wheel joint 21 and then the wheel joint 21 is reversed inwardly relative to the frame 1, until the cart frame is completely folded. When the cart frame is put into use, the electric motor 61 is triggered to drive the turbine 62 to be rotated oppositely, and thereby reverse the wheel assembly outwardly, until the wheel 22 is completely unfolded.

Figure 7:
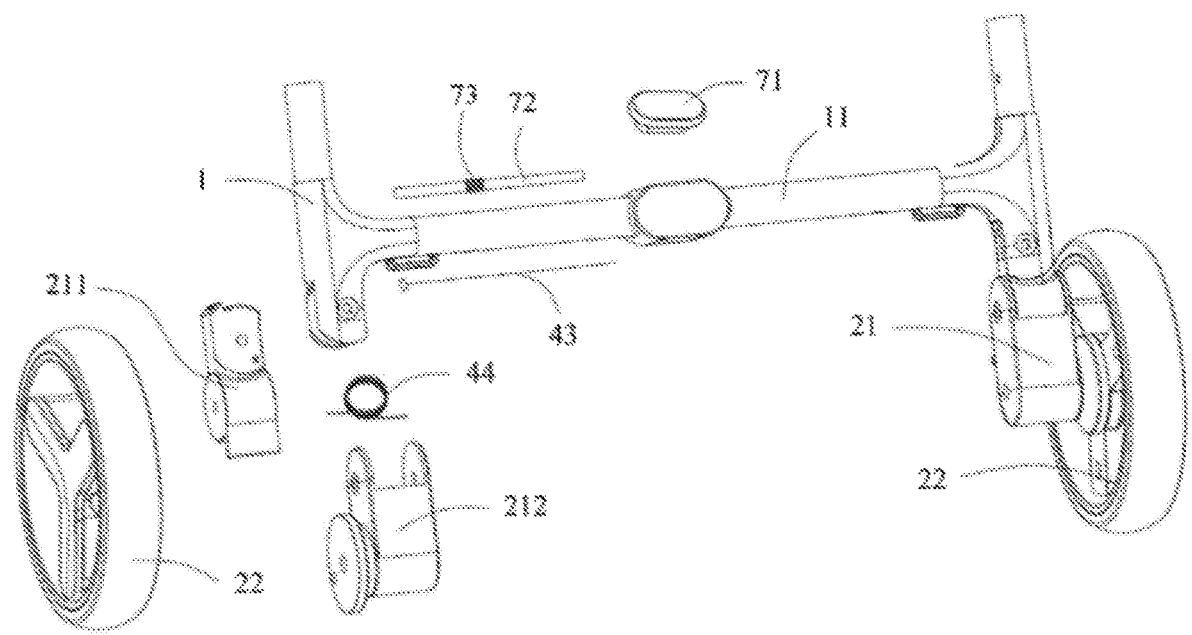
FIG. 7 is a partially exploded schematic view of the wheel reversing mechanism according to a further aspect of the present disclosure.

As shown in FIG. 7, in another example, two wheel reversing mechanisms 100 in parallel are connected with each other by means of a horizontal rod 11. The locking mechanism is provided within the horizontal rod 11. The locking mechanism includes an unlocking member 71, locking rod 72 and a restore spring 73. Wherein, the unlocking member 71 is provided on the horizontal rod 11, the locking rod 72 is positioned in the horizontal rod 11 and respectively connected to the unlocking member 71 and the wheel joint 21. The actuator 4 includes a traction cable 43 that is connected between the unlocking member 71 and the wheel joint 21 and a torsion spring 44 that is connected between the wheel joint 21 and the frame 1, wherein the wheel 22 is in an unfolded state when the torsion spring 44 is in an initial state. In use, the unlocking member 71 is controlled to pull the locking rod 72 to be unlocked from the wheel joint 21, herein the restore spring 73 is in a compression state, the unlocking member 71 is controlled again to pull the traction cable 43 to reverse the wheel joint 21 inwardly until to be folded. When the cart is required to be used, the unlocking member 71 is released, such that the traction cable 43 is released, the torsion spring 44 restores the wheel joint 21 to an unfolded state upon the action of the restoring force, the locking rod 72 is locked to the wheel joint 21 upon the action of the restore spring 73, and thereby the wheel assembly is in an unfolded state.

The wheel reversing mechanism 100 of the present disclosure can be reversed by means of the linkage assembly while the cart frame is folded. Particularly, after unlocking by means of the locking mechanism, the actuator 4 is used to realize the reversion of the wheel assembly 2, such that the wheel assembly 2 is folded conveniently, and thus occupies smaller space after being folded.

Figure 8:
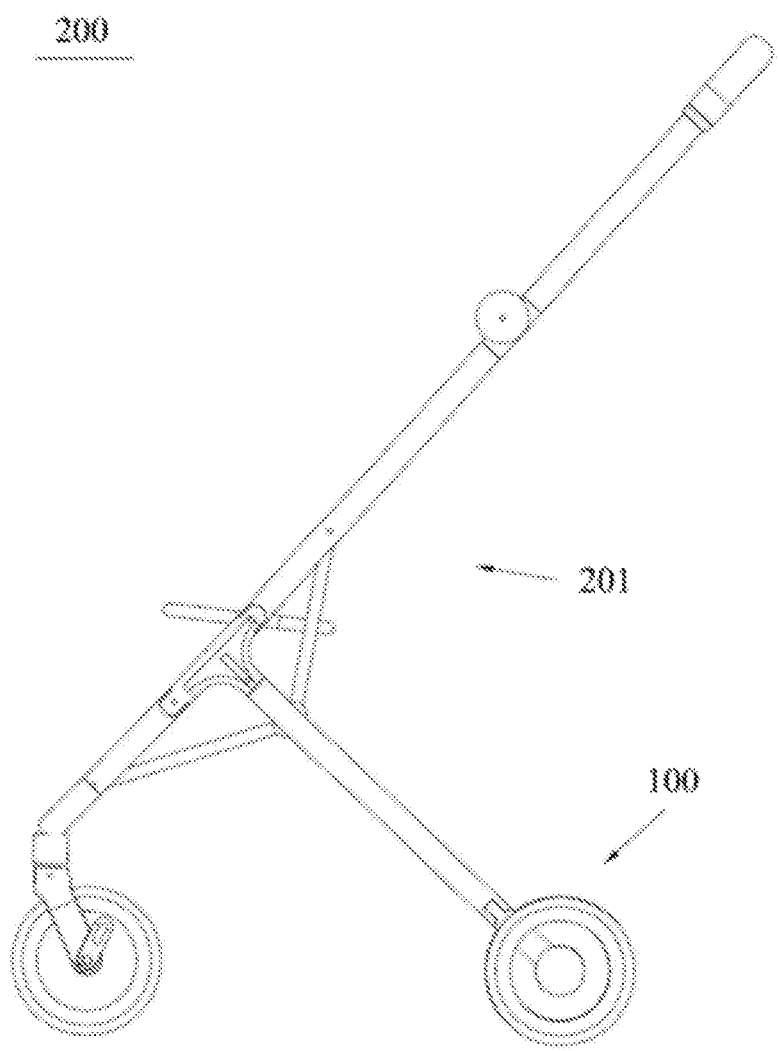
FIG. 8 is a schematic structural diagram of a cart frame according to an aspect of the present disclosure.

As shown in FIG. 8, according to another aspect of the present disclosure, there is provided a cart frame 200, including a main body 201 and the wheel reversing mechanism 100 according to the examples as described above. The wheel reversing mechanism 100 is provided at the main body 201. Wherein, the wheel assembly of the wheel reversing mechanism 100 is rotatable relative to the main body 201 under the action of the linkage assembly. The wheel reversing mechanism 100 of the present disclosure may be a front wheel assembly or a rear wheel assembly of the cart frame 200.

In one aspect of the present disclosure, the wheels of the wheel assembly are reversed towards the inner side of the main body 201 upon the action of the linkage assembly, wherein the wheel assembly is rotatable relative to the main body 201 by an angle of 0°~90°, and when the wheel assembly is reversed relative to the main body 201, a width of the main body 201 is the maximum width of the cart frame 200, that is, the wheel assembly is folded at the inner side of the main body 201, such that the cart frame 200 is folded as a smaller size, and thereby placed more conveniently.

The wheel reversing mechanism of the present disclosure may be used in cart frames of various types, which does not affect daily use of the cart, and also at least can fold the wheel assembly relative to the cart frame when the cart is not used such that the wheels of the wheel assembly face to the ground, stand more stably and are placed more conveniently. For example, an apparatus may include the wheel reversing mechanism according to the present disclosure. The apparatus may be a shopping cart, a baby cart, a suit case, a scooter, an electric car, a toy, a smart luggage, or any apparatus including one or more wheels.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:

1. A wheel reversing mechanism, comprising:
    a frame, a wheel assembly, and a linkage assembly disposed at least partially within the frame, wherein the linkage assembly comprises a locking mechanism and an actuator cooperated with the wheel assembly, and the wheel assembly comprises a wheel joint and a wheel connected to the wheel joint;
    wherein the wheel joint is rotatably connected to a lower end of the frame, the actuator is connected to the wheel joint, and the locking mechanism is locked to the wheel joint; and
    wherein when the linkage assembly is acted by an external force, the locking mechanism is unlocked from the wheel joint so that the actuator controls the wheel joint to rotate relative to the frame,
    wherein the locking mechanism comprises an upper gear rack, a lower gear rack, a gear that is respectively engaged with the upper gear rack and the lower gear rack, and an internal fixing plug provided within the frame, a locking member compatibly locked to the wheel joint is provided at a lower end of the lower gear rack; and
    wherein the upper gear rack, the lower gear rack and the gear are equipped within the internal fixing plug, and the gear is rotatably connected into the fixing plug by means of a pin.

2. The wheel reversing mechanism according to claim 1, wherein the locking mechanism comprises a connecting rod, a transmission rod having one end connected to a lower end of the connecting rod, a locking member connected to the other end of the transmission rod; and
    wherein the locking member, under cooperation of the connecting rod with the transmission rod, is movable in an axial direction of the frame opposite to a movement direction of the connecting rod to be locked to the wheel joint or removed from the wheel joint to be unlocked.

3. The wheel reversing mechanism according to claim 2, wherein the actuator comprises a swing bar, a lower end of the swing bar is connected to the wheel joint;
    wherein in an axial direction of the frame, an upper end of the locking mechanism is distanced away from a lower end of the frame compared to a free end of the actuator; and
    wherein along a length of the actuator a dimension difference between the locking mechanism and actuator is greater than or equal to a dimension of the locking member.

4. The wheel reversing mechanism according to claim 2, wherein the actuator comprises a traction cable and a torsion spring connected between the wheel joint and the frame, and a lower end of the traction cable is connected to the wheel joint; and
    wherein the wheel joint is reversed relative to the frame upon the action of the torsion spring, and restored to a working state upon a tension force of the traction cable.

5. The wheel reversing mechanism according to claim 1, wherein the actuator comprises a swing bar, a lower end of the swing bar is connected to the wheel joint;
    wherein in an axial direction of the frame, an upper end of the locking mechanism is distanced away from a lower end of the frame compared to a free end of the actuator; and
    wherein along a length of the actuator a dimension difference between the locking mechanism and actuator is greater than or equal to a dimension of the locking member.

6. The wheel reversing mechanism according to claim 1, where in the actuator comprises a traction cable and a torsion spring connected between the wheel joint and the frame, and a lower end of the traction cable is connected to the wheel joint; and
    wherein the wheel joint is reversed relative to the frame upon the action of the torsion spring, and restored to a working state upon a tension force of the traction cable.

7. The wheel reversing mechanism according to claim 1, wherein the actuator comprises an actuation gear rack, a gear cooperated with the actuation gear rack is provided on an end of the wheel joint.

8. The wheel reversing mechanism according to claim 7, wherein the actuation gear rack is movable in an axial direction of the frame upon the action of the external force such that the wheel joint is rotatable about an axis connecting the frame and the wheel joint.

9. The wheel reversing mechanism according to claim 1, wherein the wheel joint comprises an adaptor, a wheel seat, and a damper spring provided between the adaptor and the wheel seat.

10. The wheel reversing mechanism according to claim 9, wherein the adaptor comprises a first axial bore connected to the frame and a second axial bore connected to the wheel seat.

11. The wheel reversing mechanism according to claim 10, wherein the wheel seat comprises an axial connection part compatibly connected to the second axial bore and a third axial bore connected to the wheel.

12. The wheel reversing mechanism according to claim 11, wherein an axial direction of the second axial bore is identical to an axial direction of the third axial bore, and an axial direction of the first axial bore is perpendicular to the axial direction of the second axial bore.

13. The wheel reversing mechanism according to claim 1, wherein the wheel is rotatable within a range of −180 to 180 degrees relative to the frame.

14. A cart frame, comprising: a main body and a wheel reversing mechanism on the main body; wherein the wheel reversing mechanism comprises: a frame, a wheel assembly, and a linkage assembly disposed at least partially within the frame,
wherein the linkage assembly comprises a locking mechanism and an actuator cooperated with the wheel assembly, and the wheel assembly comprises a wheel joint and a wheel connected to the wheel joint;
wherein the wheel joint is rotatably connected to a lower end of the frame, the actuator is connected to the wheel joint, and the locking mechanism is locked to the wheel joint;
wherein when the linkage assembly is acted by an external force, the locking mechanism is unlocked from the wheel joint so that the actuator controls the wheel joint to rotate relative to the frame;
wherein the locking mechanism comprises an upper gear rack, a lower gear rack, a gear that is respectively engaged with the upper gear rack and the lower gear rack, and an internal fixing plug provided within the frame, a locking member compatibly locked to the wheel joint is provided at a lower end of the lower gear rack;
wherein the upper gear rack, the lower gear rack and the gear are equipped within the internal fixing plug, and the gear is rotatably connected into the fixing plug by means of a pin; and
wherein the wheel assembly of the wheel reversing mechanism is rotatable relative to the main body upon the action of the linkage assembly.

15. The cart frame according to claim 14, wherein the wheel of the wheel assembly is reversed towards an inner side of the main body upon the action of the linkage assembly; wherein the wheel assembly is rotatable relative to the main body by an angle of 0 to 90 degrees, and when the wheel assembly is reversed relative to the main body, a width of the main body is a maximum width of the cart frame.

16. An apparatus comprising:
a main body and a wheel reversing mechanism on the main body; wherein the wheel reversing mechanism comprises: a frame, a wheel assembly, and a linkage assembly disposed at least partially within the frame,
wherein the linkage assembly comprises a locking mechanism and an actuator cooperated with the wheel assembly, and the wheel assembly comprises a wheel joint and a wheel connected to the wheel joint;
wherein the wheel joint is rotatably connected to a lower end of the frame, the actuator is connected to the wheel joint, and the locking mechanism is locked to the wheel joint;
wherein the locking mechanism is configured to be unlocked from the wheel joint so that the wheel joint is rotatable relative to the frame;
wherein the locking mechanism further comprises an upper gear rack, a lower gear rack, a gear that is respectively engaged with the upper gear rack and the lower gear rack, and an internal fixing plug provided within the frame, a locking member compatibly locked to the wheel joint is provided at a lower end of the lower gear rack; and
wherein the upper gear rack, the lower gear rack and the gear are equipped within the internal fixing plug, and the gear is rotatably connected into the fixing plug by means of a pin.

17. The apparatus according to claim 16, wherein the wheel joint comprises an adaptor, a wheel seat, and a damper spring provided between the adaptor and the wheel seat.

18. The apparatus according to claim 17, wherein the adaptor comprises a first axial bore connected to the frame and a second axial bore connected to the wheel seat; and
wherein the wheel seat comprises an axial connection part compatibly connected to the second axial bore and a third axial bore connected to the wheel.

19. The apparatus according to claim 18, wherein an axial direction of the second axial bore is identical to an axial direction of the third axial bore, and an axial direction of the first axial bore is perpendicular to the axial direction of the second axial bore.

* * * * *